INVENTOR.
THEODORE G. LINDERME.
BY
Thos. S. Donnelly
ATTORNEY.

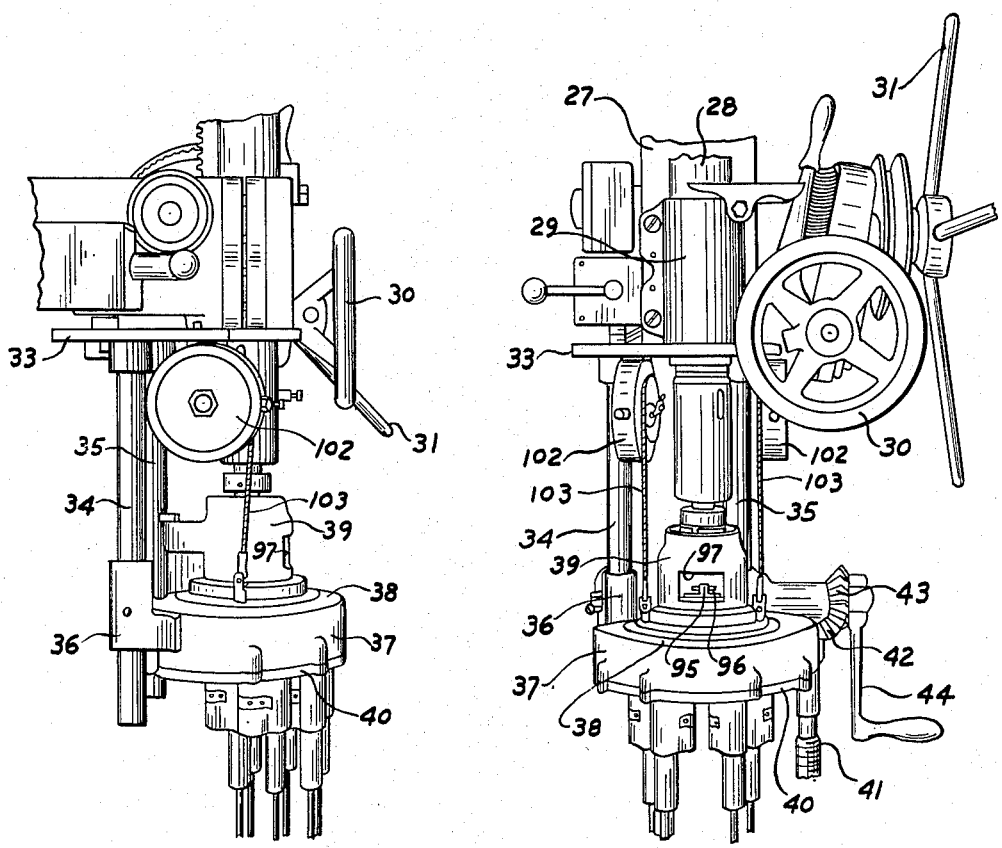

July 21, 1953 T. G. LINDERME 2,646,149
TORQUE LIMITING DRIVE FOR MULTIPLE
DRILL AND TAPPING HEADS
Filed Feb. 10, 1951 5 Sheets-Sheet 3

INVENTOR.
THEODORE G. LINDERME.
BY
*Thos L Donnelly*
ATTORNEY.

July 21, 1953

T. G. LINDERME 2,646,149

TORQUE LIMITING DRIVE FOR MULTIPLE
DRILL AND TAPPING HEADS

Filed Feb. 10, 1951

INVENTOR.
THEODORE G. LINDERME.

BY Thos. L. Donnelly

ATTORNEY

July 21, 1953

T. G. LINDERME 2,646,149

TORQUE LIMITING DRIVE FOR MULTIPLE
DRILL AND TAPPING HEADS

Filed Feb. 10, 1951

INVENTOR.
THEODORE G. LINDERME
BY
Thos S Donnelly
ATTORNEY.

Patented July 21, 1953

2,646,149

UNITED STATES PATENT OFFICE 2,646,149

TORQUE LIMITING DRIVE FOR MUTIPLE DRILL AND TAPPING HEADS

Theodore G. Linderme, Detroit, Mich.

Application February 10, 1951, Serial No. 210,341

3 Claims. (Cl. 192—48)

My invention relates to a new and useful improvement in a multiple drill and tapping head whereby a number of holes in a work-piece may be drilled or tapped simultaneously. It is an object of the present invention to provide a device of this class which will be simple in structure, economical of manufacture, durable, compact and highly efficient in use.

Another object of the invention is the provision in a structure of this type of a means whereby the torque may be adjusted so as to avoid the breaking of drills or taps.

Another object of the invention is the provision in a structure of this type of a mechanism whereby a positive drive in either direction may be effected.

Another object of the invention is the provision in a structure of this type of a cam mechanism so arranged and constructed that the operation thereof will be positive.

Another object of the invention is the provision in a structure of this type of a means whereby a displacement of the parts while in use may be avoided.

Other objects will appear hereinafter.

It is recognized that various modifications and changes may be made in the detail of structure illustrated without departing from the invention and it is intended that the present disclosure shall be considered but the preferred embodiment.

Forming a part of this application are drawings in which,

Fig. 1 is a side elevational view of a machine embodying the invention.

Fig. 2 is a view similar to Fig. 1 taken at right angles to Fig. 1.

Figure 3:
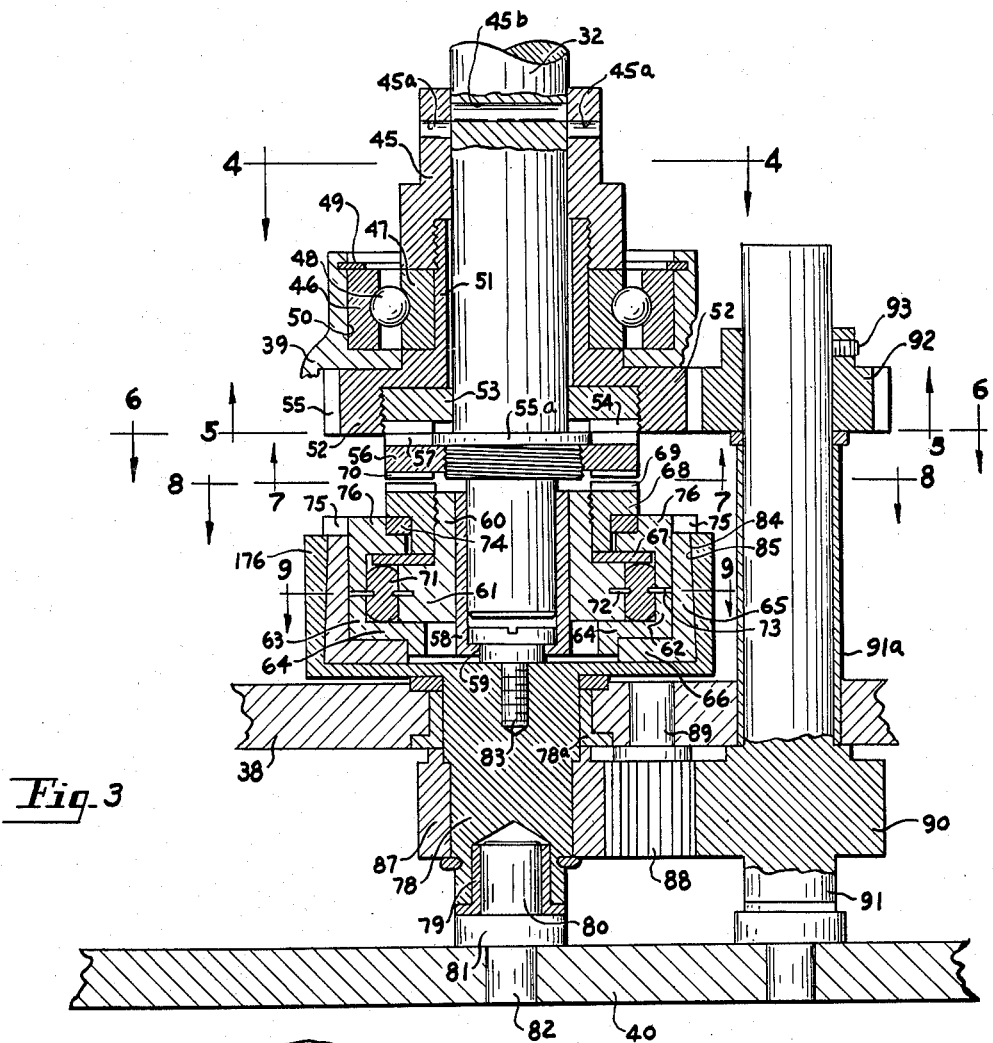
Fig. 3 is a slightly enlarged central longitudinal sectional view of the invention.
Figure 4:
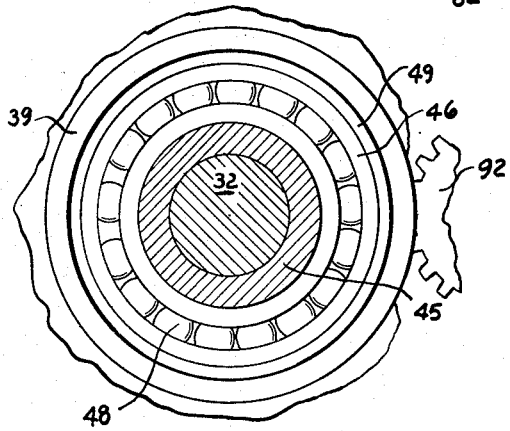
Fig. 4 is a fragmentary view taken on line 4—4 of Fig. 3.
Figure 5:
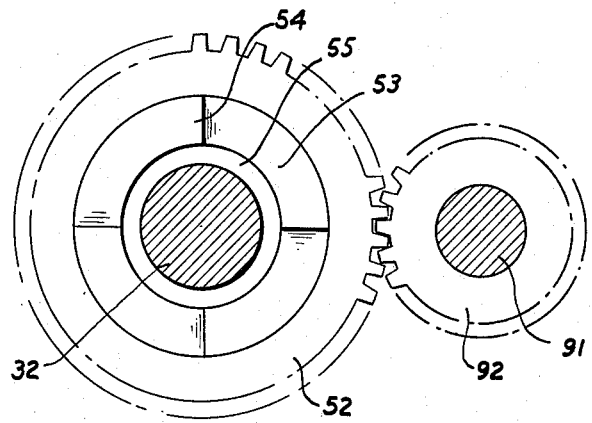
Fig. 5 is a view taken on line 5—5 of Fig. 3.
Figure 6:
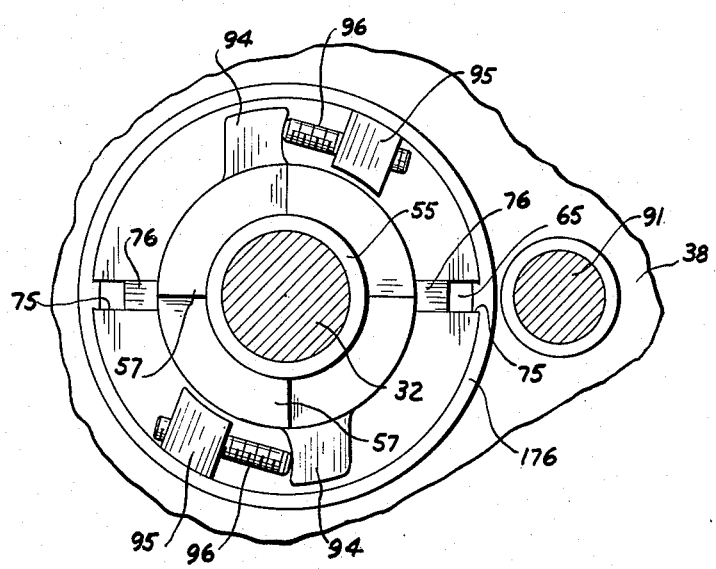
Fig. 6 is a view taken on line 6—6 of Fig. 3.
Figure 7:
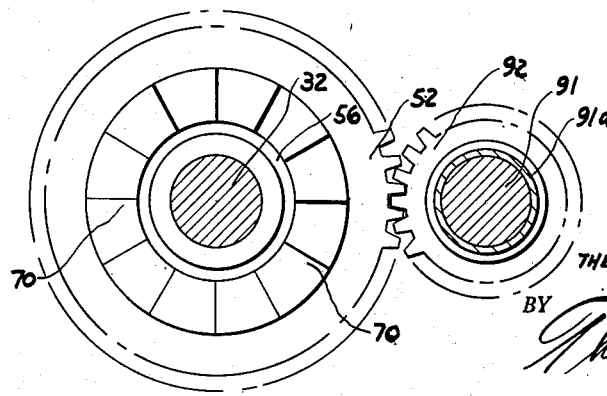
Fig. 7 is a view taken on line 7—7 of Fig. 3.
Figure 8:
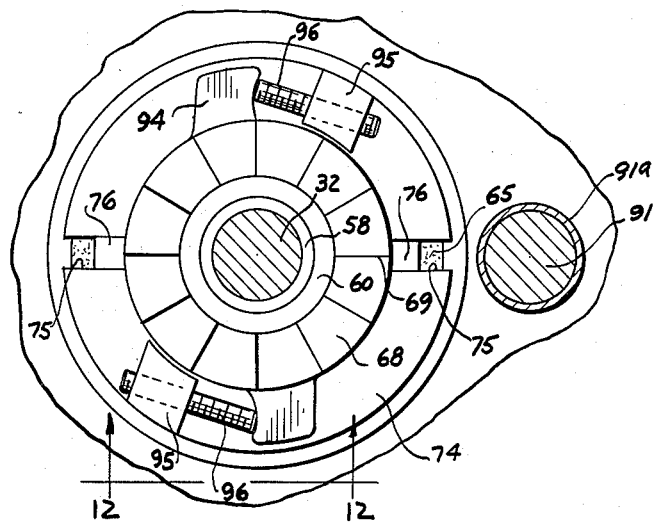
Fig. 8 is a fragmentary view taken on line 8—8 of Fig. 3.
Figure 11:
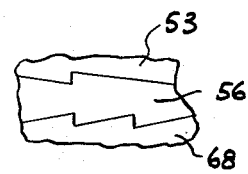
Fig. 11 is a fragmentary side elevational view of the clutch member used in the invention.

The invention is illustrated as used with a drilling machine 27 having a quill 28 projected through the bracket 29 and adapted to be raised and lowered through suitable gearing which may be controlled by the hand wheel 30 and the hand wheel 31. Extending through this quill 28 is the drive shaft 32. Mounted on the bracket 29 is a flange 33 projecting downwardly from which are rods 34 and 35 which slidably project through guide sleeves 36 mounted on the housing 37 which has a top 38 and to which is secured a housing 39. This housing 37 may be termed the gear housing and is provided with a bottom 40 and the housing 39 may be termed the clutch housing. Extending downwardly from the housing 37 is the threaded rod 41 actuated through the gears 42, 43 and 44 for raising and lowering the table in a well-known manner.

A collar 45 is provided with openings 45a formed therethrough adapted to register with the passage 45b extended through the shaft 32, so that when a pin is projected through these openings and the passage 45b the collar 45 will rotate in unison with the shaft 32 (see Fig. 3). This collar or hub 45 is threaded on the sleeve 51 which extends upwardly from the gear 52 having teeth 55 on its periphery. A clutch plate 53 is threaded into the recess formed in the gear 52 and this clutch plate 53 is provided on its lower face with the teeth 54.

Formed on the shaft 32 is a flange 55a positioned above a threaded portion and threaded on this threaded portion is the central clutch plate 56 having teeth 57 on its upper face adapted for engaging the teeth 54.

A cup shaped bushing 58 serves to receive the lower end of the shaft 32 and a central opening is formed in the bottom 59 of this cup shaped bushing 58. The bushing 58 is positioned in the bore of the hub 60 which carries at its lower end a cam block 61. This cam block is embraced by a pair of semi-circular shoes 62 and 63, which are formed channel shaped and each provided with a bottom 64. The periphery of these shoes is covered by a layer 65 of brake lining and a layer 66 lies beneath the bottom 64. Embracing the hub 60 and lying upon the upper face of the cam block 61 is a disc 67 which serves as a closure for the upper end of a raceway in which are positioned rollers.

Figure 9:
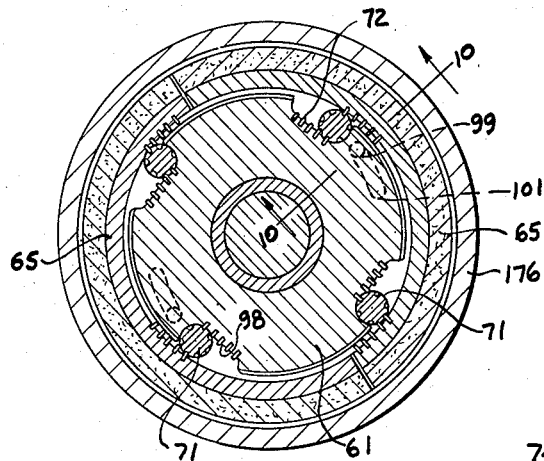
Fig. 9 is a view taken on line 9—9 of Fig. 3.
Figure 12:
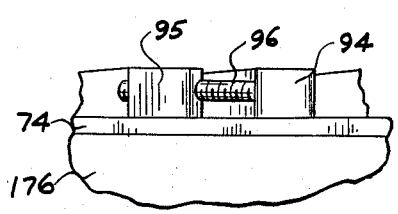
Fig. 12 is a fragmentary elevational view taken on line 12—12 of Fig. 8.

Threaded onto the hub 60 is a lower clutch plate 68 having teeth 69 on its upper face adapted for engaging the teeth 70 on the lower face of the fixed clutch plate 56. The rollers 71 are each provided at opposite sides with recesses in which engage the pins 73 projecting inwardly from the shoes 62 and 63 and in which engage the pins 72 projecting outwardly from the cam block 61. As shown in Fig. 9 the cam block 61 is provided with the recesses 98 in which the rollers 71 engage. By use of these recesses and pins a proper relative positioning of the rollers to the cam block and the shoes is assured.

Embracing the neck of the clutch plate 68 is a torque plate 74 having diametrically opposite side slots 75 formed therein for reception of a tongue 76 projecting upwardly from each of the shoes.

These shoes are positioned in a cup shaped cone 176 (see Fig. 3 and Fig. 9). This cone 176 is provided with a stud 78 which projects through a bushing 78a mounted in the top 38 of the housing 37. The lower end of the stud 78 is provided with a bushing 79 in which seats a stud 80 having a peripheral flange 81 and provided with the portion 82 which is pressed into the bottom 40 of the housing 37. A screw 83 is threaded into the stud 78.

The opposed faces 84 and 85 of the cone and the brake lining are inclined so that as the shoes are pressed outwardly into snugger engagement with the inner face of the cone 176 the shoe has a tendency to move inwardly of the cone or downwardly of Fig. 3.

Fixedly mounted on the stud 78 and rotating in unison therewith is a gear 87 having teeth which mesh with the gear 88 mounted on the stud 88. This gear 89 meshes with the gear 90 which is formed on the shaft 91 and which is projected through the bushing 91a and provided at its upper end with the gear 92 fixed thereto by means of a set screw 93. This gear 92 may be removed by removal of the set screw 93. The gear 92 is adapted to mesh with the teeth 55 on the member 52.

Extending outwardly from the opposite sides of the clutch plate 68 are the lugs 94. On the torque plate 74 are bosses 95 through each of which threaded a stud 96, the end of this stud 96 being adapted to engage a face of one of the lugs 94.

Figure 10:
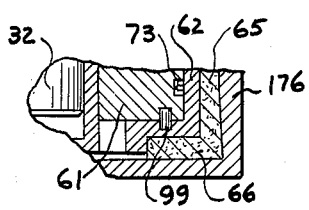
Fig. 10 is a fragmentary view taken on line 10—10 of Fig. 9.

Carried by the cam block 61 and projecting downwardly therefrom, as shown in Fig. 10 and in Fig. 9, is a pin 99 engaging in an elongated slot 101 formed in the shoe 66.

These pins 99 serve to retain the brake shoes in proper rotative relation to the cam block 61.

Mounted on the flange 33 are the housings 102, each of which contains a spring roller on which is wound a flexible cord 103. These cords serve to normally retain the housing 39 in elevated relation to the shaft 32 so that the teeth 69 would be in mesh with the teeth 70. Since the clutch plate 56 rotates in unison with the shaft 32 the clutch plate 68 would thereby be rotated so that the cam block 61 would rotate to expand the shoes against the cone 176 and thus effect a rotation of the gears 88, 90, 92 and 52. As the cam block 61 begins to rotate it will carry with it the rollers 71 so that as they ride upon the high side of the recess 98 the shoes and brake lining will be forced outwardly into close contact with the inner face of the cone walls. The pins serve to retain the rollers in proper position. Should excessive torque be encountered, the rotation of the cone 176 would be retarded because of the resistance transmitted thereto through the gear 87 and the stud 78. This would result in the shoes 62 and 63 being forced farther radially outwardly to increase the frictional engagement between the inner face of the cone 176 and the lining 65 against which the shoes bear, so that the frictional engagement driving the cone would increase as the resistance to rotation of the cone 176 increases. This might be an undesirable situation in many operations and particularly where the mechanism is used with a drilling or tapping machine. It should be kept in mind that the shoes 62 and 63 are forced radially outwardly because of a relative rotation between these shoes and the cam block 61 operating on the rollers 71 (see Fig. 9). An examination of Fig. 9 clearly indicates that if the shoes and the cam block do not move relatively a forcing of the shoes radially outwardly could not be effected. When the shoes have been forced outwardly sufficient so that the frictional engagement with the cone effects a rotation of the cone and excessive torque resistance is transmitted to the cone the shoes will also be retarded. Since the projection or tongue 76 engages in the slot 75 formed in the torque plate 74, this torque plate also will be retarded so that there will be a relative rotation of the clutch plate 68 and the torque plate 74. As this relative rotation continues the lugs 94, extending outwardly from the clutch plate 68, will engage the ends of the studs 96 which are threaded into the bosses 95, which are mounted on the torque plate 74 and thus the torque plate will then move in unison with the clutch plate 68 and further relative movement of the cam block 61 and the shoes 62 and 63 is prevented. In this manner there can be no increase in the frictional engagement between the lining 65 and the inner surface of the cone 176 because there can be no further relative movement of the cam plate 61 and the shoes 62 and 63. Should the torque resistance of the cone increase the shoe lining would ride around the inner surface of the cone. The housing 39, as clearly shown in Fig. 2, is provided with an opening 97 through which the blocks 95 and the studs 96 are accessible, so that these studs may be adjusted in the blocks 95 to regulate and adjust the amount of torque accomplished in the operation of the device.

It is believed obvious that by moving the clutch plate 56 upwardly or downwardly a reverse rotation may be effected thus making it possible to use the mechanism either for drilling or for tapping. When drilling the gear 92 would be moved out of mesh with the gear 52 and the lower clutch teeth 69 would be engaged and a pin would be inserted through the openings 45a and the passage 45b.

Figure 13:
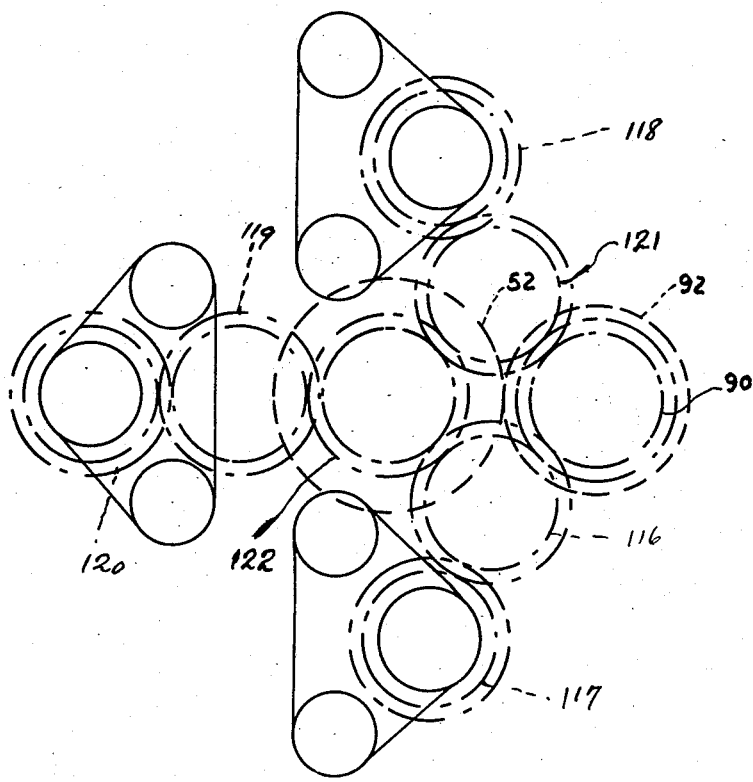
Fig. 13 is a diagrammatic view illustrating the gearing used in the invention.

In the drawings I have illustrated a multiple number of spindles which may be either drills or taps and these are driven from the main shaft 32 by suitable gearing. In Fig. 13 I have indicated in the diagrammatic view a chain of gearing in which the gear 52 rotates in unison with the gear 122. This gear 122 rotates the gear 121 which in turn rotates the gear 118. The gear 122 rotates in unison with the gear 52 and serves through the idlers 116 and 119 to drive the gears 117 and 120. In this manner the invention may be used as a multiple drill or tapping head.

What I claim is:

1. In a mechanism of the class described a rotating shaft; a cone housing; a plurality of shoes positioned in said housing and movable outwardly into engagement with the inner surface thereof; a cam plate rotatable in unison with said shaft and positioned in said cone housing; rollers engageable with the periphery of said cam plate and adapted upon rotation of said cam plate, for moving said shoes outwardly into frictional engagement with said housing; a torque plate embracing said shaft and having notches formed therein; a projection extending outwardly from each of said shoes engaging in said notches; a boss mounted on said torque plate; a threaded member threaded through said boss and projecting outwardly from one side thereof, the extent of projection being adjustable upon threading of said threaded member in said boss and an engagement member carried by and rotatable in unison with said shaft for engaging said threaded member upon relative movement of said cam plate and said shoes beyond a predetermined distance.

2. In a device of the class described a rotatable shaft; a clutch plate fixedly mounted on said shaft; a cone housing; a clutch plate positioned below said first named clutch plate and engageable therewith, upon axial movement of said shaft downwardly for rotation in unison with said shaft; a cam plate fixedly mounted on said second named clutch plate for rotating in unison therewith; friction shoes positioned in said cone housing beyond the periphery of said cam plate; rollers positioned between the periphery of said cam plate and said friction shoes, said cam plate having a cam surface for engagement with said rollers, said rollers effecting, upon rotation of said cam plate, an outward movement of said shoes into engagement with said cone housing; a torque plate embracing said shaft and having notches formed in its periphery; a projection extending from each of said shoes and engaging in one of said notches; a boss on said torque plate; and a threaded screw threaded through said boss and projecting outwardly from one side thereof, the extent of projection being adjustable upon threading of said screw; and an engagement member rotating in unison with said second named clutch plate for engaging said screw and preventing relative movement of said cam plate and said shoes beyond a predetermined distance.

3. In a mechanism of the class described, a rotating shaft; a cone housing; a plurality of shoes positioned in said housing and movable radially relatively to the inner surface of said housing, the inner surface of said housing being axially inclined from one end to the other; brake lining positioned between the outer face of said shoes and the inner surface of said cone and movable into engagement with the inner surface of said cone upon radial outward movement of said shoes; a cam plate rotatable in unison with said shaft and positioned in said cone housing; rollers engageable with the periphery of said cam plate and adapted, upon rotation of said cam plate, for moving said shoes outwardly into frictional engagement with said housing; a torque plate embracing said shaft and having notches formed therein; a projection extending outwardly from each of said shoes engaging in said notches; a boss mounted on said torque plate; a threaded member threaded through said boss and projecting outwardly from one side thereof, the extent of projection being adjustable upon threading of said threaded member in said boss and an engagement member carried by and rotatable in unison with said shaft for engaging said threaded member upon relative movement of said cam plate and said shoes beyond a predetermined distance.

THEODORE G. LINDERME.

References Cited in the file of this patent

UNITED STATES PATENTS

| Number | Name | Date |
|---|---|---|
| 298,608 | Mohr | May 13, 1884 |
| 836,097 | Dann | Nov. 20, 1906 |
| 838,024 | Hendricks | Dec. 11, 1906 |
| 1,537,629 | Street | May 12, 1925 |
| 1,887,091 | Gifford | Nov. 8, 1932 |
| 1,915,542 | Lundin | June 27, 1933 |
| 1,945,053 | Lundin | Jan. 30, 1934 |
| 1,998,275 | Emrick | Apr. 16, 1935 |
| 2,399,966 | Welch | May 7, 1946 |